April 14, 1959 W. H. LEWIS 2,881,865
HAND TRUCKS
Filed March 28, 1956 2 Sheets-Sheet 1
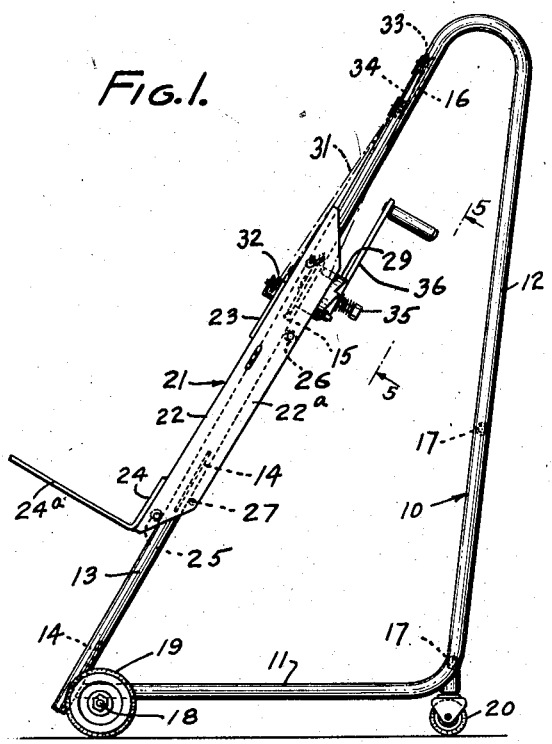
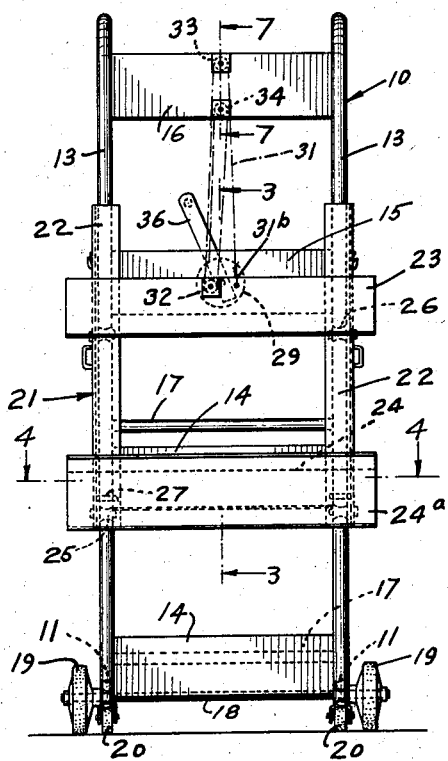
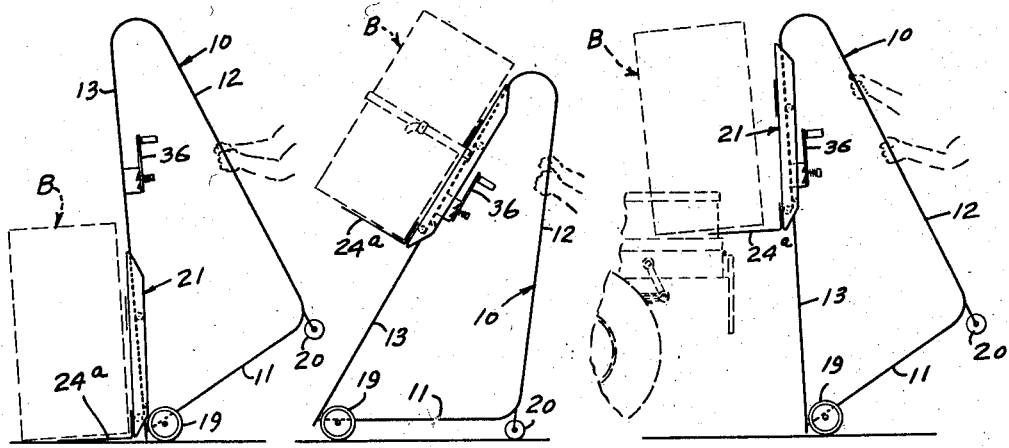
INVENTOR.
WILLIAM HURST LEWIS
BY
C. Lauren Maltby
ATTORNEY

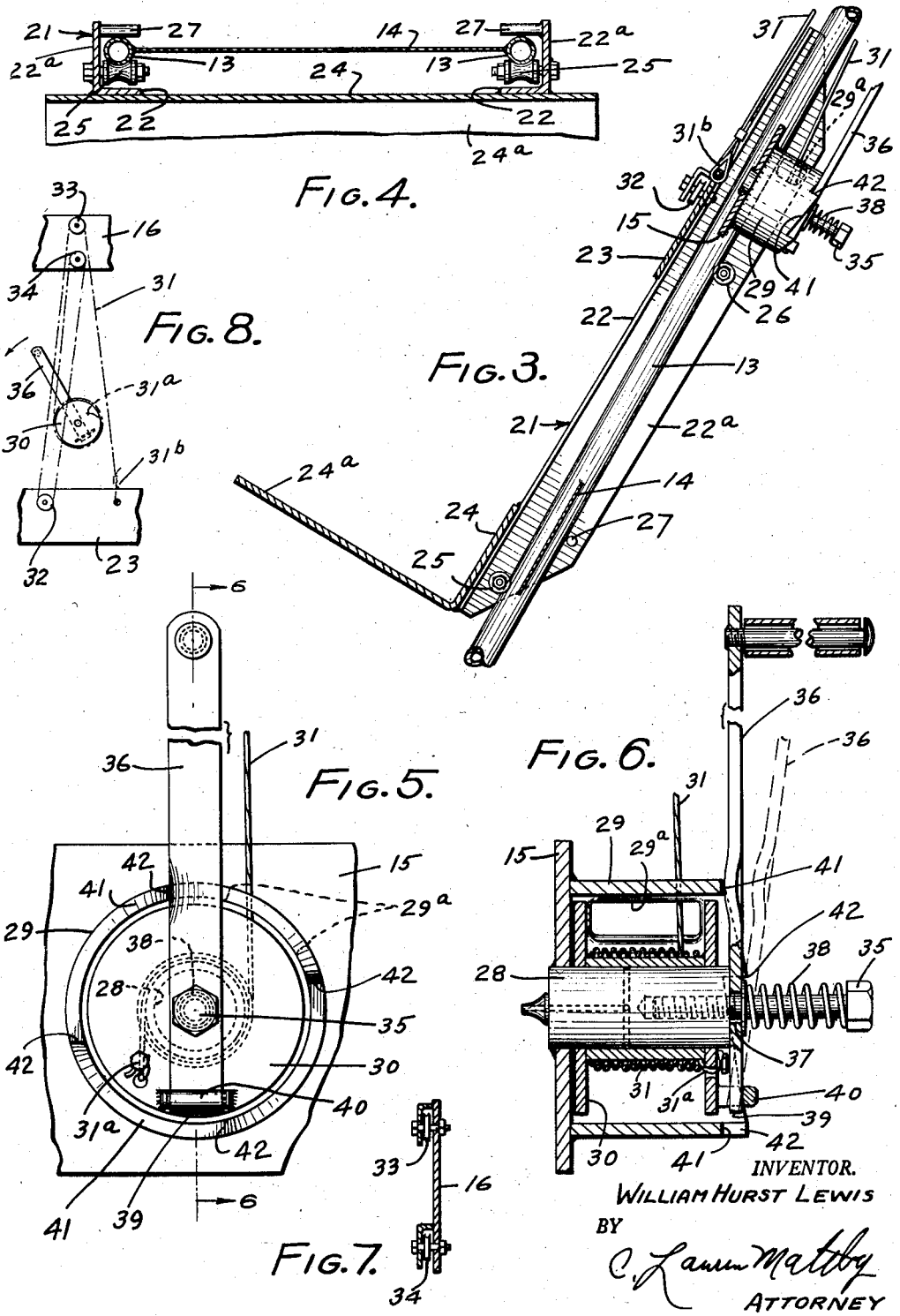

United States Patent Office 2,881,865
Patented Apr. 14, 1959

2,881,865

HAND TRUCKS

William Hurst Lewis, Arcadia, Calif., assignor to T-L Holding Co., Arcadia, Calif., a limited partnership Application March 28, 1956, Serial No. 574,497

2 Claims. (Cl. 187—10)

This invention relates to utility apparatus and more especially to improvements in hand trucks.

An object of the invention is to provide a simple, practical and efficient hand truck of the character described.

Another object of the invention is to provide a hand truck of improved construction that is capable of handling unusually heavy loads than heretofore.

A further object of the invention is to provide an improved light weight hand truck having novel hoisting features while maintaining stability of the truck while standing or being moved from one point to another.

Other objects and advantages will appear and be brought out more fully in the following specification, reference being had to the accompanying drawings wherein:

Figure 1 is a side elevation view of a hand truck incorporating the present invention.

Figure 2 is a front elevation view of the same.

Figure 3 is an enlarged partial sectional view taken along the line 3—3 of Figure 2.

Figure 4 is an enlarged sectional view taken along the line 4—4 of Figure 2.

Figure 5 is an enlarged fragmentary view taken along the line 5—5 of Figure 1.

Figure 6 is a sectional view taken along the line 6—6 of Figure 5.

Figure 7 is an enlarged partial sectional view taken along the line 7—7 of Figure 2.

Figure 8 is a fragmentary view showing the cable and pulley features of the invention.

Figures 9, 10 and 11 are diagrammatic views illustrating the mode of operation of the invention.

Referring more particularly to the drawings, the truck of this invention is a structure having a pair of identical side frame members 10 which may be of any suitable material but are shown as made of tubular bar stock, each member 10 having a base portion 11, an upright or rear handle portion 12, and forward portions 13, the lower end of which is suitably secured to the forward end of base portion 11. The two frame members 10 are secured together by a plurality of spacer or frame plates 14, 15 and 16 and by one or more spacer bars 17, as desired or needed, the assembly being preferably by welding or any equivalent method. An axle 18 is secured at the front end of frame base portions 11 and has wheels 19 journaled thereon. At the rear of frame portions 11 a pair of swivel castors 20 are provided.

A carriage 21 is constructed for slidable movement along the frame portions 13 and comprises a pair of angle members 22, an upper plate 23 and a lower plate 24, the latter having a forwardly extending load supporting flange or foot-piece 24a. Angle members 22 have rearwardly extending flanges 22a and each flange provides mounting for a pair of guide rollers 25 and 26 and a guide pin 27, by which construction the carriage 21 is suitably maintained on the frame member portions 13. A bearing pin 28 extends rearwardly from plate 15 and may be secured thereto as by extending through an aperture in the plate and being suitably welded thereto, and a circular housing 29 is similarly secured to plate 15. A reel 30 has bearing mounting on pin 28, and a cable 31 has one end portion 31a suitably secured to the reel and extends through an opening 29a in housing 29 and has its other end 31b suitably secured to carriage plate member 23. This plate member mounts a cable roller 32 and the frame plate member 16 mounts a pair of guide rollers 33 and 34, over all of which rollers the cable 31 is coursed, as indicated in Figure 8. Bearing pin 28 has a threaded end portion in which is secured a bearing screw 35 which carries a crank arm 36, the latter having an aperture 37 through which screw 35 extends, the crank arm being biased toward the bearing pin 28 by a compression spring 38 carried by the bearing screw 35. Crank arm 36 has an extension portion 39 which is positioned in a loop or strap 40 suitably formed or secured on the side of reel 30. The outer edge portion of housing 29 is formed with a plurality of cam surfaces 41 forming abutments 42 which may be engaged by crank arm 36 for preventing retrograde rotation of the reel 30 when the carriage has been elevated and supporting a load article. Aperture 37 in the crank arm 36 is large enough to permit the crank arm to be tilted to the dotted line position shown in Figure 6, to permit such retrograde movement of the drum when it is desired to lower the carriage and its load, as should be obvious.

The operation of the invention should be clear from the foregoing description. Figure 1 shows the normal unloaded position of the truck, and when it is desired to pick up a load the carriage 21 is lowered so that foot-piece 24a is in the lower extremity of the frame, and the truck can be tilted, as shown in Figure 9, and the foot-piece slipped under the load article, such as box B, and the truck thereupon swung back to the normal position with casters 20 again resting on the floor. Crank 36 may now be rotated with the result that cable 31 is wound up on reel 30, and the carriage 21 elevated through the medium of the compound pulley system described, so that the load article B is in the position shown in Figure 10, and it will be clear from this figure that the load article is so positioned with respect to its center of gravity and the base of the truck that the truck is completely stable. The truck may be now wheeled to any desired place for unloading and, as shown in Figure 11, the load item may be readily placed on an elevated platform or table, or removed therefrom, as will be obvious to those skilled in this art.

Having described my invention what I claim is:

1. In a hand truck the combination of: a wheeled base, an elongated frame extending upwardly of said base, winch means on said frame, a load supporting carriage slidably mounted on said frame, and a cable secured to and between said carriage and manually actuatable winch means for elevating said carriage, said winch means including a cable winding drum and a crank for said drum, said crank being shiftable with respect to the axis of said drum, said frame having a plurality of locking abutments engageable with said crank, said crank being spring biased toward said abutments.

2. As a new article of manufacture, a hand truck comprising a pair of tubular side frame members each substantially in the form of a right triangle, transverse plate members secured at their ends as by welding between said frame members, wheels at the ends of the short sides of said triangles, a load supporting carriage slidable on the frame members and comprising at least one transverse plate member and a pair of angle iron guide members, frame member engaging rollers carried by said guide members, winch means on said frame and a cable secured between said carriage and winch means for elevating said carriage.

References Cited in the file of this patent

UNITED STATES PATENTS

| | | |
|---|---|---|
| 769,994 | Fererro | Sept. 13, 1904 |
| 1,108,771 | McLendon | Aug. 25, 1914 |
| 1,781,104 | De Lamar | Nov. 11, 1930 |
| 1,913,295 | Schreck | June 6, 1933 |
| 2,493,824 | Noros | Jan. 10, 1950 |
| 2,514,825 | Zenko | July 11, 1950 |

FOREIGN PATENTS

| | | |
|---|---|---|
| 141,265 | Australia | May 16, 1951 |